United States Patent
Kanazirev et al.

(10) Patent No.: US 8,314,281 B2
(45) Date of Patent: Nov. 20, 2012

(54) LIGHT PARAFFIN ISOMERIZATION WITH IMPROVED FEED PURIFICATION

(75) Inventors: Vladislav I. Kanazirev, Arlington Heights, IL (US); Jayant K. Gorawara, Buffalo Grove, IL (US)

(73) Assignee: UOP LLC, Des Plaines, IL (US)

(*) Notice: Subject to any disclaimer, the term of this patent is extended or adjusted under 35 U.S.C. 154(b) by 387 days.

(21) Appl. No.: 12/795,231

(22) Filed: Jun. 7, 2010

(65) Prior Publication Data

US 2010/0326886 A1    Dec. 30, 2010

Related U.S. Application Data

(60) Provisional application No. 61/220,303, filed on Jun. 25, 2009.

(51) Int. Cl.
*C07C 5/27* (2006.01)
(52) U.S. Cl. .................. 585/737; 585/747; 585/748
(58) Field of Classification Search .............. 585/737, 585/747, 748
See application file for complete search history.

(56) References Cited

U.S. PATENT DOCUMENTS

| | | | |
|---|---|---|---|
| 2,915,365 A | 12/1959 | Saussol | |
| 4,863,894 A | 9/1989 | Chinchen et al. | |
| 6,224,840 B1 * | 5/2001 | Kim et al. | 423/244.02 |
| 7,906,088 B2 | 3/2011 | Kanazirev et al. | |
| 2005/0023191 A1 | 2/2005 | Shih et al. | |
| 2006/0261011 A1 | 11/2006 | Kanazirev et al. | |
| 2008/0119358 A1 | 5/2008 | Kanazirev et al. | |
| 2008/0173586 A1 | 7/2008 | Kanazirev et al. | |
| 2008/0286173 A1 | 11/2008 | Shecterle | |

FOREIGN PATENT DOCUMENTS

EP    0400228 A1    12/1990

* cited by examiner

*Primary Examiner* — Thuan D Dang
(74) *Attorney, Agent, or Firm* — Mark Goldberg

(57) ABSTRACT

The service life and deactivation rate of a paraffin isomerization catalyst is improved through use of a new sulfur guard bed containing a chloride additive. This sulfur guard bed, which contains supported CuO material having an increased resistance to reduction, shows such improvement. Thus, the danger of run-away reduction followed by a massive release of water and deactivation of an isomerization catalyst is practically eliminated. The fact that the guard bed material preserves the active metal phase-copper in an active (oxide) form is an important advantage leading to very low sulfur content in the product stream. The sulfur capacity per unit weight of sorbent is also significantly increased, making this sorbent a superior cost effective sulfur guard product.

10 Claims, No Drawings

LIGHT PARAFFIN ISOMERIZATION WITH IMPROVED FEED PURIFICATION

CROSS-REFERENCE TO RELATED APPLICATION

This application claims priority from Provisional Application No. 61/220,303 filed Jun. 25, 2009, the contents of which are hereby incorporated by reference.

BACKGROUND OF THE INVENTION

Paraffin Isomerization units in refineries are used to convert low octane $C_5/C_6$ streams into high-octane products and to produce i-$C_4$ for motor alkylation or methyl tert-butyl ether (MTBE) production. Chlorided alumina catalysts are commonly used in a light paraffin isomerization process such as the UOP Butamer and Penex processes. These catalysts are irreversibly deactivated by water or oxygenate precursors thereof (CO, $CO_2$, methanol, etc.). Most paraffin isomerization units are equipped with dryers to remove moisture, to slow catalyst deactivation. In addition, traces (ppm concentrations) of sulfur compounds such as $H_2S$, mercaptans, sulfides and thiophenes are poisons for isomerization catalysts. Therefore, guard beds based mainly on supported metal oxides are sometimes installed in front of the feed dryers. At the operating temperatures, typically 93° to 204° C. (200° to 400° F.) of the sulfur guard beds, the metal oxides reduce rapidly, thereby evolving large quantities of water which can overwhelm the feed driers and damage the expensive isomerization catalysts. The present invention involves an improvement to the feed purification of the paraffin isomerization units which use supported copper oxide (optionally, in addition to other metal oxides) for trace sulfur removal.

Guard beds with supported copper oxide (CuO) are often used for feed purification in the isomerization units. Unfortunately, the CuO reduces in the presence of the hot hydrocarbons, at the typical operating temperatures in the range of 93° to 204° C. (200° to 400° F.), which causes conversion of CuO to Cu2O and even to Cu metal, thereby producing water as reaction product. Typically the reduction of CuO occurs rapidly, and large amounts of water are produced. The excessive moisture could even overcome the down stream feed dryers and water leakage from the driers will cause irreversible catalyst deactivation.

Copper containing materials are widely used in industry as catalysts and sorbents. The water shift reaction in which carbon monoxide is reacted in presence of steam to make carbon dioxide and hydrogen as well as the synthesis of methanol and higher alcohols are among the most practiced catalytic processes nowadays. Both processes employ copper oxide based mixed oxide catalysts.

Copper-containing sorbents play a major role in the removal of contaminants, such as sulfur compounds and metal hydrides, from gas and liquid streams. One new use for such sorbents involve the on-board reforming of gasoline to produce hydrogen for polymer electrolyte fuel cells (PEFC). The hydrogen feed to a PEFC must be purified to less than 50 parts per billion parts volume of hydrogen sulfide due to the deleterious effects to the fuel cell of exposure to sulfur compounds.

Copper oxide (CuO) normally is subject to reduction reactions upon being heated but it also can be reduced even at ambient temperatures in ultraviolet light or in the presence of photochemically generated atomic hydrogen.

The use of CuO on a support that can be reduced at relatively low temperatures is considered to be an asset for some applications where it is important to preserve high dispersion of the copper metal. According to U.S. Pat. No. 4,863,894, highly dispersed copper metal particles are produced when co-precipitated copper-zinc-aluminum basic carbonates are reduced with molecular hydrogen without preliminary heating of the carbonates to temperatures above 200° C. to produce the mixed oxides. However, easily reducible CuO is disadvantageous in some important applications, such as the removal of hydrogen sulfide from gas and liquid streams when very low residual concentration of H2S in the product is required The residual $H_2S$ concentration in the product gas is much higher (which is undesirable) when the CuO reduces to Cu metal in the course of the process since reaction (1) is less favored than the CuO sulfidation to CuS.

$$2Cu+H_2S=Cu_2S+H_2 \qquad (1)$$

The known approaches to reduce the reducibility of the supported CuO materials are based on combinations with other metal oxides such as $Cr_2O_3$. The disadvantages of the approach of using several metal oxides are that it complicates the manufacturing of the sorbent because of the need of additional components, production steps and high temperature to prepare the mixed oxides phase. As a result, the surface area and dispersion of the active component strongly diminish, which leads to performance loss. Moreover, the admixed oxides are more expensive than the basic CuO component which leads to an increase in the sorbent's overall production cost.

The present invention comprises a new method to Improve feed purification in the light paraffin isomerization process by using supported CuO adsorbent which contains chloride as a means to decrease the tendency of CuO to be reduced to low valent state, especially Cu metal. Surprisingly, it has now been found that introducing chloride either in the basic copper carbonate, which serves as CuO precursor, or into the intermediate CuO-alumina adsorbent leads to material having improved resistance to reduction by hydrocarbons. This feature is useful in light paraffin isomerization process

SUMMARY OF THE INVENTION

The present invention provides an improved paraffin isomerization process that consists of using a sulfur removal guard bed that contains supported CuO material having an increased resistance to reduction. As a result of the use of this guard bed, the deactivation rate and the service life the paraffin isomerization catalyst significantly improves. This invention employs a supported CuO material whereby the resistance of the CuO phase towards reduction has been significantly increased. Thus, the danger of run-away reduction followed by a massive release of water and deactivation of an isomerization catalyst is strongly diminished. In addition, the maximum water load to the down stream dryers is decreased. Finally, another important benefit is that the guard bed material preserves the active metal phase—copper in an active (oxide) form which is needed for complete sulfur removal. This advantage will result in a significant increase in sulfur capacity per unit weight of sorbent making this sorbent a more cost effective sulfur guard product.

The improved sulfur guard adsorbents of the present invention contain CuO supported on alumina wherein small amounts of an inorganic halide, such as sodium chloride is added to the carbonate precursor of CuO or to the intermediate adsorbent before the final thermal treatment (calcination) for a sufficient time at a temperature in the range 280° to 500° C. These reduction resistant sorbents show significant benefits in the removal of sulfur and other contaminants from gas and liquid streams. These sorbents are particularly useful in applications where the sorbents are not regenerated. Sulfur contaminants that are removed include H2S, light mercaptans, sulfides, disulfides, thiophenes and other organic sulfides and COS. Mercury can also be removed.

DETAILED DESCRIPTION OF THE INVENTION

Guard beds with supported copper oxide (CuO) are often used for feed purification in the isomerization units. Unfortunately, the CuO reduces in the presence of the hot hydrocarbons, at the typical operating temperatures in the range of 90° to 210° C., which causes conversion of CuO to Cu2O and even to Cu metal, thereby producing water as reaction product. Typically the reduction of CuO occurs rapidly, and large amounts of water are produced. The excessive moisture could even overcome the down stream feed dryers and water leakage from the dryers will cause irreversible catalyst deactivation.

This invention employs a supported CuO material whereby the resistance of the CuO phase towards reduction has been significantly increased. Thus, the danger of run-away reduction followed by a massive release of water and deactivation of isomerization catalyst is strongly diminished. In addition, the maximum water load to the down stream dryers is decreased. Finally another important benefit is that the guard bed material preserves the active metal phase-copper in an active (oxide) form which is needed for complete sulfur removal. This advantage will result in a significant increase in sulfur capacity per unit weight of sorbent making this sorbent a more cost effective sulfur guard product.

Basic copper carbonates such as $CuCO_3 \cdot Cu(OH)_2$ can be produced by precipitation of copper salts, such as $Cu(NO)_3$, $CuSO_4$ and $CuCl_2$, with sodium carbonate. Depending on the conditions used, and especially on washing the resulting precipitate, the final material may contain some residual product from the precipitation process. In the case of the $CuCl_2$ raw material, sodium chloride is a side product of the precipitation process. It has been determined that a commercially available basic copper carbonate that had both residual chloride and sodium, exhibited lower stability towards heating and improved resistance towards reduction than another commercial BCC that was practically chloride-free.

In some embodiments of the present invention, agglomerates are formed comprising a support material such as alumina, copper oxide from a precursor such as basic copper carbonate (BCC) and halide salts. The alumina is typically present in the form of transition alumina which comprises a mixture of poorly crystalline alumina phases such as "rho", "chi" and "pseudo gamma" aluminas which are capable of quick rehydration and can retain substantial amount of water in a reactive form. An aluminum hydroxide $Al(OH)_3$, such as Gibbsite, is a source for preparation of transition alumina. The typical industrial process for production of transition alumina includes milling Gibbsite to 1 to 20 microns particle size followed by flash calcination for a short contact time as described in the patent literature such as in U.S. Pat. No. 2,915,365. Amorphous aluminum hydroxide and other naturally found mineral crystalline hydroxides e.g., Bayerite and Nordstrandite or monoxide hydroxides (AlOOH) such as Boehmite and Diaspore can be also used as a source of transition alumina. In the experiments done in reduction to practice of the present invention, the transition alumina was supplied by the UOP LLC plant in Baton Rouge, La. The BET surface area of this transition alumina material is about 300 $m^2/g$ and the average pore diameter is about 30 Angstroms as determined by nitrogen adsorption.

Typically a solid oxysalt of a transitional metal is used as a component of the composite material. For the purpose of the examples presented of the present invention, we used basic copper carbonate (BCC), $CuCO_3Cu(OH)_2$ which is a synthetic form of the mineral malachite, produced by Phibro Tech, Ridgefield Park, N.J. The particle size of the BCC particles is approximately in the range of that of the transition alumina—1 to 20 microns. Another useful oxysalt would be Azurite—$Cu_3(CO_3)_2$ $(OH)_2$. Generally, oxysalts of copper, nickel, iron, manganese, cobalt, zinc or a mixture of elements can be successfully used where copper is the main component.

The preferred inorganic halides are sodium chloride, potassium chloride or mixtures thereof. Bromide salts are also effective. The chloride content in the copper oxide sorbent may range from 0.05 to 2.5 mass-% and preferably is from 0.3 to 1.2 mass-%. Various forms of basic copper carbonate may be used with a preferred form being synthetic malachite, $CuCO3Cu(OH)2$.

The copper oxide sorbent that contains the halide salt exhibits a higher resistance to reduction by hydrocarbons and hydrogen than does a similar sorbent that is made without the halide salt. This feature is useful for feed purification in a paraffin isomerization process, especially for the removal of sulfur compounds In addition, the sorbent is useful in applications where the adsorbent is not regenerated. The removal of $H_2S$, light mercaptans, sulfides, disulfides, thiophenes and other organic sulfur compounds and COS is an advantageous use of the adsorbent. Mercury can also be removed by this adsorbent.

Table 1 lists characteristic composition data of three different basic copper carbonate powder samples designated as samples 1, 2 and 3.

TABLE 1

| Composition, | Sample Number | | |
| --- | --- | --- | --- |
| Mass-% | 1 | 2 | 3 |
| Copper | 55.9 | 55.4 | 54.2 |
| Carbon | 5.0 | 5.1 | 5.1 |
| Hydrogen | 1.3 | 1.2 | 1.2 |
| Sodium | 0.23 | 0.51 | 0.51 |
| Chloride | 0.01 | 0.32 | 0.28 |
| Sulfate | 0.06 | 0.01 | 0.02 |

All three samples were subjected to thermal treatment in nitrogen in a microbalance followed by reduction in a 5% $H_2$-95% $N_2$ stream. As the thermogravimetric (TG) analysis showed, chloride-containing BCC samples 2 and 3 decompose to CuO at about 40° to 50° C. lower temperatures than sample 1. On the other hand, the latter sample was found to reduce more easily in presence of $H_2$ than the Cl-containing samples. The reduction process completed with sample 1 at 80° to 90° C. lower temperature than in the case of the Cl-containing samples "2" and "3".

This reduction behavior was confirmed by preparing a mechanical mixture of NaCl and the Cl-free sample 1 sample and then subjecting the mixture to a TG decomposition reduction test. In particular, 25 mg of NaCl reagent was intimately mixed with about 980 mg BCC (sample 1). The mixture was homogenized for about 2 minutes using an agate mortar and pestle prior to TG measurements.

It was found that the addition of NaCl makes sample 1 decompose more easily but also makes it resist reduction to a higher extent than in the case where no chloride is present. The observed effect of NaCl addition is definitely beyond the range of experimental error.

The exact mechanism of the chloride action is unknown at this point. We hypothesize that the salt additive may incorporate in some extent in the structure of the source BCC weakening it and making it more susceptible to decomposition. On the other hand, the copper oxide produced upon thermal decomposition of BCC now contains an extraneous species that may affect key elements of the metal oxide reduction process such as $H_2$ adsorption and activation and penetration of the reduction front throughout the CuO particle as well. We do not wish to favor any particular theory of Cl action at this point.

The series of experiments in which NaCl was added was conducted in a Perkin Elmer TGA-1 microbalance operated in a helium flow. The sample size was typically 8-10 mg. Both decomposition and reduction runs were conducted with one sample at a heating rate of about 25° C./min followed by short hold at 400° C. After cooling to about ambient temperature, 1.5% $H_2$-balance-He—$N_2$ mixture was used as a reduction agent.

Table 2 presents data on several samples produced by mixing different amounts of NaCl or KCl powder to the BCC sample #1 listed in Table 1.

TABLE 2

| Sample | Basic Cu carbonate, (g) | NaCl (g) | KCl (g) | Pre-treatment temperature, ° C. | Characteristic temperature, ° C. | |
|---|---|---|---|---|---|---|
| | | | | | BCC decomposition* | CuO reduction** |
| 1 | #1 only | 0 | 0 | 400 | 335 | 256 |
| 2 | 9.908 | 0.103 | 0 | 400 | 296 | 352 |
| 3 | 9.797 | 0.201 | 0 | 400 | 285 | 368 |
| 4 | 9.809 | 0.318 | 0 | 400 | 278 | 369 |
| 5 | 9.939 | 0 | 0.150 | 400 | 282 | 346 |
| 6 | 9.878 | 0 | 0.257 | 400 | 279 | 378 |
| 7 | 0.981 | 0 | 0.400 | 400 | 279 | 382 |
| 8 | #1 only | 0 | 0 | 500 | 333 | 310 |
| 9 | 9.797 | 0.201 | 0 | 500 | 282 | 386 |

*Temperature at which 20 mass-% sample weight is lost due to BCC decomposition
**Temperature at which 5% sample weight is lost due to CuO reduction The data also shows that both NaCl and KCl are effective as a source of Cl. Adding up to 1% Cl by weight affects strongly both decomposition temperature of BCC and the reduction temperature of the resulting CuO. It can be also seen that the combination of a thermal treatment at a temperature which is higher than the temperature needed for complete BCC decomposition and Cl addition leads to the most pronounced effect on CuO resistance towards reduction—compare samples number 3, 8 and 9 in Table 2.

Finally, the materials produced by conodulizing the CuO precursor—BCC with alumina followed by curing and activation retain the property of the basic Cu carbonate used as a feed. The BCC that is more resistant to reduction yielded a CuO-alumina sorbent which was difficult to reduce.

The following example illustrates one particular way of practicing this invention with respect of CuO-alumina composites: About 45 mass-% basic copper carbonate (BCC) and about 55 mass-% transition alumina (TA) produced by flash calcination were used to obtain 7×14 mesh beads by rotating the powder mixture in a commercial pan nodulizer while spraying with water. About 1000 g of the green beads were then additionally sprayed with about 40 cc 10% NaCl solution in a laboratory rotating pan followed by activation at about 400° C. The sample was then subjected to thermal treatment & reduction in the Perkin Elmer TGA apparatus as described earlier. Table 3 summarizes the results to show the increased resistance towards reduction of the NaCl sprayed sample.

TABLE 3

| | | Characteristic temperature of TGA analysis, ° C. | |
|---|---|---|---|
| Sample | Preparation condition | BCC decomposition* | CuO reduction** |
| 10 | Nontreated | 341 | 293 |
| 11 | Nontreated + activation | n/a | 302 |
| 12 | NaCl treated | 328 | 341 |
| 13 | NaCl treated + activation | n/a | 352 |

*Temperature at which 20 mass-% sample weight is lost due to BCC decomposition
**Temperature at which 5% sample weight is lost due to CuO reduction A cost-effective way to practice the invention is to leave more NaCl impurity in the basic Cu carbonate during the production. This can be done, for example, by modifying the procedure for the washing of the precipitated product. One can then use this modified BCC precursor to produce the sorbents according to our invention.

Another way to practice the invention is to mix solid chloride and metal oxide precursor (carbonate in this case) and to subject the mixture to calcinations to achieve conversion to oxide. Prior to the calcinations, the mixture can be co-formed with a carrier such as porous alumina. The formation process can be done by extrusion, pressing pellets or nodulizing in a pan or drum nodulizer.

Still another promising way to practice the invention is to co-nodulize metal oxide precursor and alumina by using a NaCl solution as a nodulizing liquid. The final product containing reduction resistant metal (copper) oxide would then be produced after proper curing and thermal activation.

Two large samples labeled A and B were produced in a similar way to that of samples #11 and #13 listed in Table 3 correspondingly. The samples were tested for water evolution upon treatment with liquid hydrocarbon feed at a temperature of 160° C. and 1379 kPa (200 psig) pressure. A tubular reactor of 2.22 cm (⅞ inch) ID was used where about 24 grams 7×14 mesh beads were placed to form a segmented bed which could be analyzed after the run. Sulfur free naphtha with a boiling range of 80° to 150° C. was used as a feed at a rate of about 110 g/hour. The feed and the effluent were analyzed for moisture content by using sensors expressing the moisture content as a dew point in degrees C. The feed naphtha had a moisture content equivalent to Dew point of about −20° C. Before introducing the liquid feed, the samples were subjected to thermal treatment at 260° C. in dry nitrogen gas followed by cooling to the test temperature.

TABLE 4

| Time on stream, minutes | Comment | Dew point ° C. | |
|---|---|---|---|
| | | Sample A | Sample B |
| 120 | | −65 | −69 |
| 240 | | −63 | −69 |
| 360 | | −62 | −63 |
| 420 | | −50 | −58 |
| 480 | | −35 | −53 |
| 600 | | −15 | −44 |
| 720 | | −1 | −36 |
| 840 | | 7 | −30 |

TABLE 4-continued

| Time on stream, minutes | Comment | Dew point ° C. | |
|---|---|---|---|
| | | Sample A | Sample B |
| 960 | | 14 | −26 |
| 1050 | | 17 | −23 |
| 1200 | Upper range of sensor | 20 | −20 |
| 1320 | | 20 | −18 |
| 1500 | | 20 | −14 |
| 1800 | | 20 | −10 |
| 2040 | | 20 | −9 |
| 2400 | | 20 | −7 |
| 2610 | | 20 | −6 |
| 3000 | | 20 | −5 |
| 6300 | | 20 | 10 |
| | X-ray analysis | Cu metal and some $Cu_2O$, no CuO detected | $Cu_2O$ and CuO, only trace Cu metal detected |

The data in Table 4 shows that the reference sample A that does not contain chloride starts producing large amount of moisture about 400 minutes after start of the run. After about 1200 minutes on stream, Sample A produces so much water that the upper limit of the moisture probe of about 20° C. has been reached and water forms a separate phase. At the same time, the Sample B according to the invention shows only slow increase of the effluent moisture due to drying up the entering feed, which had a moisture content equivalent to a dew point of −20° C., and a possible slow reduction at long times on stream.

X-ray analysis on the spent sorbent materials after the run indicated an almost complete reduction of Sample A to Cu metal and some $Cu_2O$ while the chloride containing sample B contained almost no Cu metal along with $Cu_2O$ and CuO, the latter still present as crystalline phase.

The data in Table 4 show that the guard material according this invention produces less water and consequently is more stable at the application relevant conditions.

Samples A and B described in the previous example were subjected to a test in which the naphtha feed was spiked with about 150 ppmw S as propyl mercaptan was fed as outlined in the previous example through the reactor system at 125° to 140° C. for about 200 hours with each sample. The spent samples after the run were analyzed for sulfur to determine that the S content in the inlet portion of Sample B produced according the invention has about 20% more sulfur than the inlet reference sample—Sample A.

The invention claimed is:

1. A process for isomerizing a paraffinic stream containing paraffins and sulfur-compound poisons for an isomerization catalyst comprising steps:
   1) sending said paraffinic stream through a sulfur guard bed to remove said sulfur compounds from the paraffinic feedstock to produce a paraffinic stream having a reduced sulfur content, wherein said sulfur guard bed comprises sorbents comprising CuO supported on an alumina substrate and about 0.001 to 2.5% by weight of a chloride additive, wherein said sulfur sorbents are prepared by steps:
      i) mixing basic copper carbonates $CuCO_3.Cu(OH)_2$ and alumina, and water to form beads,
      ii) adding NaCl or KCl to the beads of step (i);
      iii) activating the beads of step (ii) by heat treating at a temperature ranging from 280 to 500° C.;
   2) isomerizing said paraffinic stream having a reduced sulfur content of step (1) in the presence of said isomerization catalyst to produce an isomerized paraffinic product.

2. The process of claim 1 wherein said sulfur guard bed comprises about 10 to 85% by weight CuO.

3. The process of claim 1 wherein said sulfur guard bed comprises about 20 to 60% by weight CuO.

4. The process of claim 1 wherein said sulfur guard bed comprises about 30 to 50% by weight CuO.

5. The process of claim 1 wherein said sulfur guard bed further comprises a metal oxide in addition to said CuO.

6. The process of claim 1 wherein said sulfur guard bed comprises 0.3 to 1.0 weight percent of said chloride.

7. The process of claim 1 wherein said sulfur compounds are selected from the group consisting of mercaptans, sulfides, disulfides, thiophenes, COS, hydrogen sulfide and mixtures thereof.

8. The process of claim 1 wherein said chloride additive provides at least a 25% reduction in water evolution during start-up of the sulfur guard bed upstream of said paraffin isomerization catalyst when compared to a sulfur guard bed that does not contain said chloride additive.

9. The process of claim 1 wherein said chloride additive provides at least a 40% reduction in water evolution during start-up of the sulfur guard bed upstream of said paraffin isomerization catalyst when compared to a sulfur guard bed that does not contain said chloride additive.

10. The process of claim 1 wherein said paraffin isomerization catalyst is a chlorided alumina catalyst.

* * * * *